US007120864B2

(12) United States Patent
Cai et al.

(10) Patent No.: US 7,120,864 B2
(45) Date of Patent: Oct. 10, 2006

(54) ELIMINATING SUPERFLUOUS NAMESPACE DECLARATIONS AND UNDECLARING DEFAULT NAMESPACES IN XML SERIALIZATION PROCESSING

(75) Inventors: Mengchu Cai, Redmond, WA (US); Jason Alexander Cu, Cupertino, CA (US); Yue Huang, San Jose, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 10/766,764

(22) Filed: Jan. 27, 2004

(65) Prior Publication Data

US 2005/0166140 A1 Jul. 28, 2005

(51) Int. Cl.
*G06F 17/00* (2006.01)
(52) U.S. Cl. ..................................... 715/513
(58) Field of Classification Search ............... 715/513; 707/3, 4
See application file for complete search history.

(56) References Cited

U.S. PATENT DOCUMENTS

| 5,089,985 | A | 2/1992 | Chang et al. |
| 5,428,737 | A | 6/1995 | Li et al. |
| 5,764,973 | A | 6/1998 | Lunceford et al. |
| 5,778,354 | A | 7/1998 | Leslie et al. |
| 5,822,747 | A | 10/1998 | Graefe et al. |
| 5,845,299 | A | 12/1998 | Arora et al. |
| 5,911,145 | A | 6/1999 | Arora et al. |
| 6,070,175 | A | 5/2000 | Mezei |
| 6,105,024 | A | 8/2000 | Graefe et al. |
| 6,198,480 | B1 | 3/2001 | Cotugno et al. |
| 6,233,610 | B1 | 5/2001 | Hayball et al. |
| 6,356,906 | B1 | 3/2002 | Lippert et al. |
| 6,356,920 | B1 | 3/2002 | Vandersluis |
| 6,381,627 | B1 | 4/2002 | Kwan et al. ................ 709/201 |
| 6,405,191 | B1 | 6/2002 | Bhatt et al. |
| 6,487,546 | B1 | 11/2002 | Witkowski |
| 6,604,100 | B1 | 8/2003 | Fernandez et al. |
| 6,941,521 | B1 | 9/2005 | Lin et al. |
| 6,981,211 | B1 | 12/2005 | Claussen et al. |
| 6,981,212 | B1 | 12/2005 | Claussen et al. |
| 2001/0037345 | A1 | 11/2001 | Kieman et al. |
| 2002/0013790 | A1 | 1/2002 | Vandersluis |

(Continued)

FOREIGN PATENT DOCUMENTS

CA 2349905 6/2001

(Continued)

OTHER PUBLICATIONS

"SQL/XML Tutorial: SQL/XML, XQuery, and Native XML Programming Languages" (C) 2004-2006 http://www.stylusstudio.com/sqlxml_tutorial.html.*

(Continued)

*Primary Examiner*—Stephen Hong
*Assistant Examiner*—Adam Queler
(74) *Attorney, Agent, or Firm*—Janet M. Skafar; Ingrid M. Foerster; André Gibbs

(57) ABSTRACT

In one embodiment, at least a portion of an object model having at least one namespace is serialized. An ancestor namespace is searched for based on a current namespace declaration. The ancestor namespace is associated with an ancestor prefix and an ancestor uniform resource indicator (URI). The current namespace is associated with a current prefix and current URI. The search is performed to find an ancestor prefix matches the current prefix. When the current namespace is an implicit no default namespace and the ancestor namespace is an explicit default namespace based on, at least in part, the ancestor prefix, a serialized namespace declaration is generated for the current namespace.

27 Claims, 14 Drawing Sheets

U.S. PATENT DOCUMENTS

| | | | |
|---|---|---|---|
| 2002/0116412 A1 | 8/2002 | Barnes et al. | |
| 2002/0120652 A1 | 8/2002 | Rising, III et al. | 707/513 |
| 2003/0101434 A1 | 5/2003 | Szperski | 717/120 |
| 2003/0182268 A1 | 9/2003 | Lal | |
| 2004/0073553 A1 | 4/2004 | Brown et al. | |
| 2004/0122815 A1 | 6/2004 | Wang et al. | |

FOREIGN PATENT DOCUMENTS

| | | |
|---|---|---|
| WO | WO 01/82133 A2 | 11/2001 |
| WO | WO 03/060758 A2 | 7/2003 |

OTHER PUBLICATIONS

Microsoft Corp., "Orthogonal Optimization of Subqueries and Aggregation," by Cesar A. Galindo-Legaria and Milind M. Joshi, pp. 571-581, from ACM SIGMOD 2001, May 21-24, Santa Barbara, CA USA, © 2001.

Dessaux, Claire, "Exchanging XML-Based Messages on the Oracle91 Application Server" pp. 48-51, [online], available from http://www.XML-Journal.com, vol. 2, issue 4.

Institute of Electrical and Electronics Engineers, Inc., "XML and DB2," by Josephine Cheng and Jane XU of IBM Corp., Abstract, p. 569 from the 16th International Conference on Data Engineering, Feb. 28-Mar. 3, 2000, San Diego, California, p. 1, [online], <URL: http://www.computer.org/proceedings/icde/0506/05050569abs.html> printed on Aug. 29, 2002.

IBM Corp., XML and WebSphere Studio Application Developer—Part 3, SQl and SML, p. 1-4, [online] available from <URL: http://www7b.software.ibm.co..d/techjournal/0202_haggarty/haggarty.html>, printed on Aug. 29, 2002.

Visual Studio Magazine, "Create Powerful Web Reports," : Use VB code to generate T-SQL queries . . . , by Roger Jennings, p. 1 [online] <URL: http://fawcette.com/Arc . . . j/2001/>, printed on Aug. 29, 2002.

Syspro Times, Quarter 2, 2002, "XML Report Viewer," p. 1-8, [online] available from www.rte-cyber.com.

IBM Corp. Research Disclosure n444208, Apr. 2001, #208, p. 709, Conversion of Final Form Data, such as AFP to XML.

IBM Corp., Research Disclosure n451156, Nov. 2001, #156, p. 1966, Generating Hierarchical XML Data from a flat (Non-Hierarchical) Data Source.

U.S. Appl. No. 09/409,598, filed Sep. 30, 1999, entitled "Extensible markup Language (XML) Server Pages Having Custom Document Object Model (DOM) Tags," invented by C.S. Claussen, M.H. Conner, B.C. Zumbrunnen and M.D. McClain.

U.S. Appl. No. 09/409,600, filed Sep. 30, 1999, entitled "Method for Processing a Document Object Model (DOM) Having Custom Tags," invented by C.S. Claussen, M.H. Conner and B.C. Zumbrunnen.

Lin, Chen, Wang, Zhang, Cai, Cu and Lee, U.S. Appl. No. 10/325,781, filed Dec. 19, 2002, "Method, System and Program for Optimizing Processing of Nested Functions", assignee International Business Machines Corporation, IBM Docket No. SVL920020085US1.

Truyen et al, "Dynamic and Selective Combination of Extensions in Component-Based Application," International Conference on Software Engineering, Proceedings of the 23rd International Conference on Software Engineering, Toronto, Ontario, Canada, 2001, pp. 233-242, published by the IEEE Computer Society.

David E. Siegel, "A Proposal for a Namespace Facility in APL+WIN," APL Quad Quote, vol. 31, No. 4, pp. 25-32, Jun. 2001, ACM SigAPL.

Bergmann et al, "Vex—A CAD toolbox," Annual ACM/IEEE Design Automation Conference, Proceedings of the 36th ACM/IEEE Conference on Design Automation, New Orleans, Louisiana, USA, pp. 523-528, Jun. 1999, Published ACM Press.

Charles M. Eastman, "System Facilities for CAD Databases," Annual ACM IEEE Design Automation Conference, Proceedings of the 17th Design Automation Conference on Design Automation, Minneapolis, Minnesota, United States, pp. 50-56, 1980, published by ACM Press.

Baker et al., "Whate Terms Does Your Metadata Use? Application Profiles as Machine-Understandable Narratives," Journal of Digital Information, vol. 2, No. 2, Article No. 65, Nov. 6, 2001.

"Information technology—Database languages—SQL—Part 14: XML-Related Specifications (SQL/XML)", ISO/IEC JTC 1/SC 32, Date: Jul. 14, 2003, ISO/IEC 9075-14:2003(E), Working Draft.

"Extensible Markup Language (XML) 1.0 (Second Edition)," W3C Recommendation Oct. 6, 2000, from http://www.w3.org/TR/REC-xml.

"Namespaces in XML," World Wide Web Consortium Jan. 14, 1999, REC-xml-names-19990114, from http://www.w3.org/TR/REC-xml-names/.

"Canonical XML Version 1.0," W3C Recommendation Mar. 15, 2001, from http://www.w3.org/TR/xml-c14n.

"Document Object Model (DOM) Level 1 Specification Version 1.0," W3C Recommendation Oct. 1, 1998, REC-DOM-Level-1-19981001, Downloaded from http://www.w3.org/TR/1998/REC-DOM-Level-1-19981001/DOM.pdf.

Norman Walsh, "What is XML?", Oct. 3, 1998, From http://www.xml.com/pub/a/98/10/guide1.html.

Norman Walsh, "What do XML Documents Look Like?", Oct. 3, 1998, From http://www.xml.com/pub/a/98/10/guide2.html.

Norman Walsh, "Validity," Oct. 3, 1998, From http://www.xml.com/pub/a/98/10/guide3.html.

Norman Walsh, "Pulling the Pieces Together," Oct. 3, 1998, From http://www.xml.com/pub/a/98/10/guide4.html.

Shanmugasundaram, J., E., Shekita, R. Barr, M. Carey, B. Lindsay, H. Pirahesh, and B. Reinwald, "Efficiently Publishing Relational Data as XML Documents," The VLDB Journal, 2001, 10: pp. 133-154.

Eisenberg, A. and Melton, J., "SQL/XML is Making Good Progress," SIGMOD Record, vol. 31, No. 2, Jun. 2002, pp. 101-108.

* cited by examiner

90 →
XMLELEMENT (NAME "hr:emp", XMLNAMESPACES('http://www.example.com/hr' as "hr"),
   XMLELEMENT(NAME "hr:empno", emp.no),
   XMLELEMENT(NAME "hr:name", emp.fname || ' ' || emp.lname),
   XMLELEMENT(NAME "hr:expertise", emp.expertise) )

Example 1: Constructors

FIG. 2

100 →
```
<hr:emp xmlns:hr = "http://www.example.com/hr">
   <hr:empno>1A7168</hr:empno>
   <hr:name>Jane Doe</hr:name>
   <hr:expertise>JSP</hr:expertise>
</hr:emp>
```

Example 1: Serialized XML text

FIG. 3

110 →
SELECT XMLELEMENT(NAME "hr:emplist",
   XMLNAMESPACES('http://www.example.com/hr' as "hr"),
   XMLATTRIBUTES(dept.deptno as "deptno"),
   emplist)
FROM dept, (SELECT deptno, XMLAGG( XMLELEMENT(NAME "hr:emp",
         XMLNAMESPACES('http://www.example.com/hr' as "hr"),
         XMLELEMENT(NAME "hr:empno" emp.no),
         XMLELEMENT(NAME "hr:name", emp.fname || ' ' || emp.lname),
         XMLELEMENT(NAME "hr:expertise", emp.expertise) ) )
      FROM emp
      GROUP BY deptno) X(deptno, emplist)
WHERE dept.deptno = x.deptno;

Example 2: Query

FIG. 4

```
<hr:emplist xmlns:hr = "http://www.example.com/hr">
  <hr:emp xmlns:hr = "http://www.example.com/hr" deptno="5">
    <hr:empno>1BC245</hr:empno>
    <hr:name>John Doea </hr:name>
    <hr:expertise>C/C++</hr:expertise>
  </hr:emp>
  <hr:emp xmlns:hr = "http://www.example.com/hr">
    <hr:empno>1A7168</hr:empno>
    <hr:name>Jane Doe</hr:name>
    <hr:expertise>JSP</hr:expertise>
  </hr:emp>
  <hr:emp xmlns:hr = "http://www.example.com/hr">
    <hr:empno>1C8N12</hr:empno>
    <hr:name>James Doeb</hr:name>
    <hr:expertise>Meditation</hr:expertise>
  </hr:emp>
  ...
</hr:emplist>                      Prior Art
```

Example 2: Exemplary serialized XML text

FIG. 5

```
XMLELEMENT(NAME "emp", XMLNAMESPACES(DEFAULT 'http://www.example.com/hr'),
  XMLELEMENT(NAME "empno" emp.no),
  XMLELEMENT(NAME "name", emp.fname || ' ' emp.lname),
  XMLELEMENT(NAME "expertise", emp.expertise) )
```

Example 3: Constructors

FIG. 6

```
<emp xmlns = "http://www.example.com/hr">
  <empno>1A7168</empno>
  <name>Jane Doe</name>
  <expertise>JSP</expertise>
</emp>
```

Example 3: Exemplary serialized XML text

FIG. 7

```
SELECT XMLELEMENT(NAME "emp",
    XMLNAMESPACES(DEFAULT 'http://www.example.com/hr'),
    XMLELEMENT(NAME "empno" emp.no),
    XMLELEMENT(NAME "name", emp.fname || ' ' || emp.lname),
    XMLELEMENT(NAME "expertise", emp.expertise), projlist)
FROM emp, (SELECT empno, XMLAGG(XMLELEMENT(NAME "proj",
                                 XMLATTRIBUTES(proj as "projno"),
                                 projname) )
           FROM PROJ
           GROUP BY empno) X(empno, projlist)
WHERE emp.empno = X.empno;
```

Example 4: Query

FIG. 8

```
<emp xmlns = "http://www.example.com/hr">
   <empno>927238</empno>
   <name>John Doec</name>
   <expertise>XML Database</expertise>
   <proj projno= "579">XML Publishing Functions</proj>
   <proj projno= "592">Common Table Expressions</proj>
   ...
</emp>
```

Example 4a: Serialized XML text generated using a conventional technique

FIG. 9    Prior Art

```
<emp xmlns= "http://www.example.com/hr">
   <empno>927238</empno>
   <name>John Doec</name>
   <expertise>XML Database</expertise>
   <proj xmlns=" " projno= "579">XML Publishing Functions</proj>
   <proj xmlns=" " projno= "592">Common Table Expressions</proj>
   ...
</emp>
```

Example 4b: Serialized XML text

```
SELECT XMLELEMENT(NAME "emp",
        XMLNAMESPACES(DEFAULT 'http://www.example.com/hr'),
        XMLELEMENT(NAME "empno" emp.no),
        XMLELEMENT(NAME "name", emp.fname || ' ' || emp.lname),
        XMLELEMENT(NAME "expertise", emp.expertise),
        projname) )
FROM emp, (SELECT empno, XMLAGG(XMLELEMENT(NAME "proj",
                    XMLNAMESPACES(NO DEFAULT),  ← 202
                    XMLATTRIBUTES(projno as "projno"),
                    projname) )
    FROM PROJ
    GROUP BY empno) X(empno, projlist)
WHERE emp.empno = X.empno;
```

Example 5: Modified SQL/XML query to force conventional technique to generate correct serialized XML text

FIG. 11

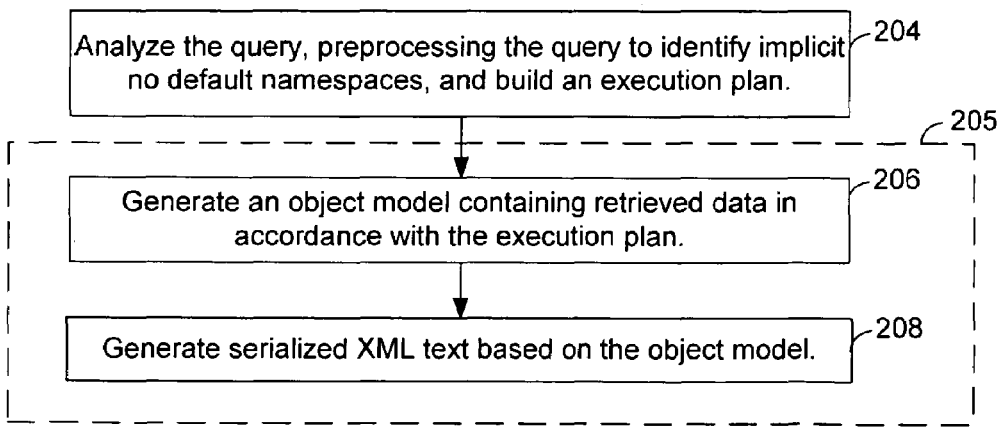

XMLELEMENT(NAME "hr:emp", XMLNAMESPACES('http://www.example.com/hr' as "hr"),
  XMLATTRIBUTES(emp.no AS "hr.empno"),
  XMLELEMENT(NAME "hr:name", emp.fname || ' ' || emp.lname),
  XMLELEMENT(NAME "hr:expertise", emp.expertise ) )

Example 6: Constructors

Hash table anchor array

350 ⟶

```
WITH MANAGE(I, MgrNo, Deptno, Deptname, EmpXMLList) as
(SELECT 1, MgrNo, Deptno, Deptname,
     XMLAGG( XMLELEMENT(NAME "x:Emp",
             XMLNAMESPACES('http://www.example.com/x' as "x"),
          EMP.EmpName) )
 FROM  DEPT, EMP
 WHERE  DEPT.Detpno = EMP.Deptno
 GROUP BY MgrNo, Deptno, Deptname
 UNION ALL                                                     ⟵ 352
  SELECT I+1, D1.MgrNo, D1.Deptno, D1.Deptname,    --- recursion part 1
     XMLELEMENT(NAME "y:Dept",
        XMLNAMESPACES('http://www.example.com/y' as "y"),
        XMLATTRIBUTES(EMP.DeptNo as "MgrDept"),
        M.EmpXMLList )
   FROM  EMP, MANAGE M
   WHERE  M.MgrNo = EMP.empno AND
      I < 10
 UNION ALL                                                     ⟵ 354
  SELECT I+1, M.mgrNo, D.Deptno, D.Deptname,      --- recursion part 2
     XMLELEMENT(NAME "z:Dept",
        XMLNAMESPACES('http://www.example.com/z' as "z"),
        XMLATTRIBUTES (D.Deptname as "DeptName"),
        M.EmpXMLList )
   FROM  DEPT D, MANAGE M
   WHERE  D.Deptno = M.Deptno AND I < 10
)
SELECT XMLELEMENT(NAME "x:Mgr",
     XMLNAMESPACES('http://www.example.com/x' as "x"),
     XMLATTRIBUTES(MgrNo as "MgrNo"),
     EMPXMLList)
FROM MANAGE
WHERE MgrNo = '101';
```

Exemplary SQL/XML query with recursion

```
struct xmlnsentry
{                               ⟵ 364
  xmlnsentry  * prev;           ⟵ 362
  xmlnamespaces * xmlnsptr;
} myxmlnsentry;
```

FIG. 22

ELIMINATING SUPERFLUOUS NAMESPACE DECLARATIONS AND UNDECLARING DEFAULT NAMESPACES IN XML SERIALIZATION PROCESSING

BACKGROUND OF THE INVENTION

1. Field of the Invention

The present invention relates generally to serialization of XML data, and in particular to XML canonicalization.

2. Description of the Related Art

Databases allow data to be stored and accessed quickly and conveniently. Various query languages may be used to access the data. An example of a typical query language is the Structured Query Language (SQL) which conforms to a SQL standard as published by the American National Standards Institute (ANSI) or the International Standards Organization (ISO). An extensible mark-up language (XML) can represent data in a serial text format. XML text can be conveniently exchanged with applications over the Internet. XML query languages, such as SQL/XML and XQuery, can be used to retrieve data from a database and represent that data in XML format.

XML query languages contain query features, called constructors, which are used to construct XML data based on input data. The constructed XML data may be stored in an internal format, such as a tree that conforms to the XQuery data model. Eventually, in many cases, the constructed XML data goes through a serialization process to generate equivalent XML text (or binary stream), also referred to as serialized data or text, for applications to consume.

An XML document may contain many element names and attribute names, and names that represent semantic information. In W3C recommendation, "Namespaces in XML", REC-xml-names-19990114, Jan. 14, 1999, to avoid name conflict, XML provides a mechanism, referred to as XML namespaces. An XML namespace provides a unique name so that semantics of names associated with the namespace are well-defined. The XML namespace is a fundamental feature of XML and in the constructed XML data. An XML namespace has a namespace name (a uniform resource identifier, i.e. URI), which is bound to a namespace prefix, and is sometimes represented as (prefix, URI). The URI is used to identify and locate resources on the Internet, and the prefix is used as a proxy for the URI.

In the serialized data, a namespace declaration, signified by the "xmlns" attribute name or prefix, is used to declare a namespace. Due to syntactic and semantic requirements of query languages, the literally serialized XML text from constructed data in an internal XML format often contains redundant XML namespace declarations. If the data returned in response to a SQL/XML query is literally serialized into text format, the namespace declarations can sometimes take up the major portion of the XML text. To reduce the amount of data and application processing expense, it is desirable to reduce the number of redundant or superfluous namespace declarations in the serialized XML text. Eliminating superfluous namespace declarations is also a part of XML canonicalization, W3C recommendation, "Canonical XML Version 1.0", 15 Mar. 2001.

In addition, when a portion of the XML data, such as an XML fragment or sub-tree, is constructed without a default namespace, but later is connected to a containing fragment or tree with a default namespace, the fragment without the default namespace has to "undeclare" the default namespace in the containing fragment. If the default namespace is not undeclared, the XML fragment or sub-tree will inherit the default namespace, which is not correct, and will cause errors.

Therefore there is a need for a technique to eliminate redundant or superfluous namespace declarations. There is also a need for a technique to undeclare inherited default namespaces for fragments or sub-trees which are constructed without a default namespace.

SUMMARY OF THE INVENTION

To overcome the limitations in the prior art described above, and to overcome other limitations that will become apparent upon reading and understanding the present specification, various embodiments of a method, apparatus, and article of manufacture for performing serialization for query processing are disclosed.

In one embodiment, during serialization of at least a portion of an object model having at least one namespace, a search is performed for an ancestor namespace based on a current namespace. The ancestor namespace is associated with an ancestor prefix and an ancestor uniform resource identifier (URI). The current namespace declaration is associated with a current prefix and current URI. A search is performed to find an ancestor prefix matches the current prefix. When the current namespace is an implicit no default namespace and the ancestor namespace is an explicit default namespace based on, at least in part, the current prefix, a serialized namespace declaration is generated for the current namespace.

In another embodiment, when no ancestor namespace has an ancestor prefix that matches the current prefix, or when an ancestor namespace matches the current prefix and the current URI is different from the ancestor URI, a serialized namespace declaration is generated for the current namespace.

In this way, inherited default namespaces for fragments or sub-trees which are constructed without a default namespace are undeclared. In addition, redundant or superfluous namespace declarations are eliminated.

BRIEF DESCRIPTION OF THE DRAWINGS

The teachings of the present invention can be readily understood by considering the following detailed description in conjunction with the accompanying drawings, in which:

FIG. 2 depicts exemplary SQL/XML constructors, referred to as example one;

FIG. 3 depicts exemplary serialized XML text containing data retrieved for the exemplary constructors of FIG. 1;

FIG. 4 depicts an exemplary SQL/XML query, referred to as example two;

FIG. 5 depicts exemplary serialized XML text, generated using conventional serialization processing, for data from an exemplary department for the exemplary query of FIG. 4;

FIG. 6 depicts additional exemplary constructors, referred to as example three, of which one constructor uses a default namespace declaration;

FIG. 7 depicts exemplary serialized XML text for data for one employee using the exemplary constructor of FIG. 6;

FIG. 8 depicts another exemplary query, referred to as example four, in which one element uses a default namespace declaration, and another element does not belong to any namespace;

FIG. 9 depicts exemplary serialized XML text for an employee for the exemplary query of FIG. 8, which was generated using a conventional serialization technique;

FIG. 10 depicts correctly serialized XML text for the exemplary query of FIG. 8 using the present inventive technique;

FIG. 11 depicts an exemplary query having an explicit "NO DEFAULT" namespace declaration to generate the correctly serialized XML text of FIG. 10;

FIG. 12 depicts a high-level flowchart of an embodiment of the processing phases;

FIG. 21 depicts an exemplary SQL/XML query that uses recursion;

FIG. 22 depicts an exemplary data structure used to track ancestor namespace declarations.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to perform serialization for query processing. The various embodiments of the present inventive technique are suited to processing a query and generating serialized text using the SQL/XML or XQuery language; however, some embodiments of the present inventive technique may also be applied to any XML serialization process.

In one embodiment, a portion of an object model is serialized. The object model has at least one namespace. A search is performed for an ancestor namespace based on a current namespace. The ancestor namespace is associated with an ancestor prefix and an ancestor URI. The current namespace is associated with a current prefix and current URI. The search is performed to find an ancestor prefix matches the current prefix. When the current namespace is an implicit no default namespace and the ancestor namespace is an explicit default namespace based on, at least in part, the ancestor prefix, a serialized namespace declaration is generated for the current namespace.

In another embodiment, when no ancestor namespace has an ancestor prefix that matches the current prefix, or when an ancestor namespace matches the current prefix and the current URI is different from the ancestor URI, a serialized namespace declaration is generated for the current namespace.

In a more particular embodiment, a technique performs serialization for an object model. When a current element has a namespace declaration comprising a current prefix and a current URI, the technique determines whether an ancestor namespace declaration, if any, has the same prefix and URI. When no ancestor namespace declaration has the same prefix, a serialized namespace declaration is generated for the current namespace declaration. When one or more ancestor namespace declarations that have the same prefix as the current namespace declaration, and when the closest ancestor namespace declaration with the same prefix also has the same URI as the current namespace declaration, no serialized namespace declaration is generated for the current namespace declaration. Otherwise, a serialized namespace declaration is generated for the current namespace declaration. In another embodiment, implicit no default namespace declarations are used to undeclare inherited default namespaces for fragments or sub-trees which are constructed without a default namespace. If an implicit no default namespace is not part of a subtree that contains a default namespace declaration, no serialized namespace declaration is generated for the implicit no default namespace.

Figure 1:
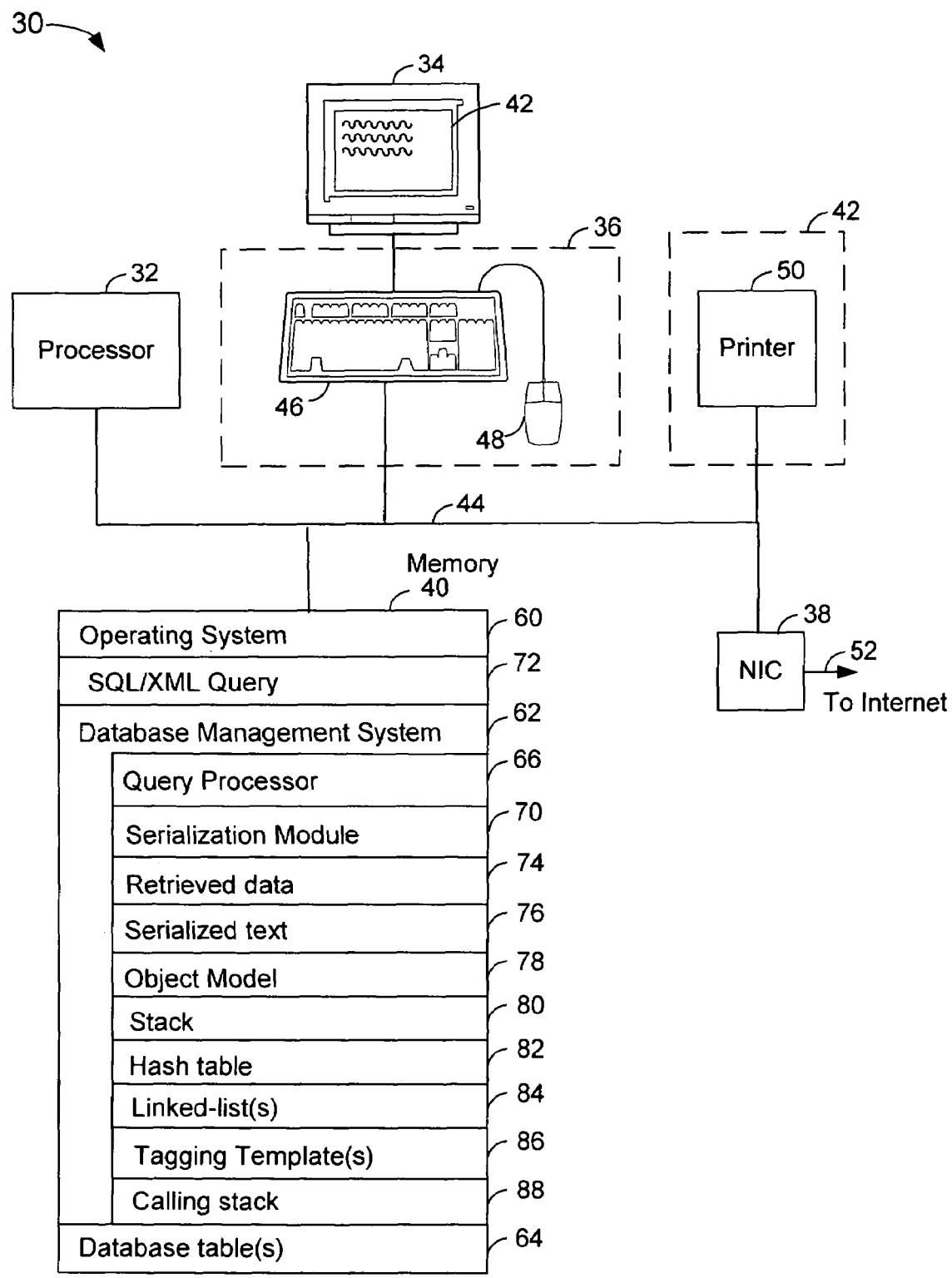
FIG. 1 depicts an illustrative computer system that uses the teachings of the present invention.

FIG. 1 depicts an illustrative computer system 30 that uses the teachings of the present invention. The computer system 30 comprises a processor 32, display 34, input interfaces (I/F) 36, communications interface 38, memory 40 and output interface(s) 42, all conventionally coupled by one or more buses 44. The input interfaces 36 comprise a keyboard 46 and mouse 48. The output interface 42 is a printer 50. The communications interface 38 is a network interface card (NIC) that allows the computer 30 to communicate via a network, such as the Internet. The communications interface 38 may be coupled to a transmission medium 52 such as, for example, twisted pair, coaxial cable or fiber optic cable. In another exemplary embodiment, the communications interface 38 provides a wireless interface, that is, the communications interface 38 uses a wireless transmission medium.

The memory 40 generally comprises different modalities, illustratively semiconductor memory, such as random access memory (RAM), and disk drives. In some embodiments, the memory 40 stores an operating system 60, database management system 62 and database tables 64 used by the database management system 62. The database management system 62 comprises a query processor 66 and a serialization module 70. The computer system 30 receives a SQL/XML query 72. For example, the SQL/XML query 72 may have been sent from another application to the computer system 30 via the Internet. The query processor 66 retrieves the data 74 from the database tables 64 in response to the SQL/XML query 72. The serialization module 70 generates serialized XML text 76 based on the SQL/XML query 72 and the retrieved data 74.

Depending on the embodiment, the memory also stores data structures including, but not limited to, any one or combination of the following: an object model 78, a stack 80, a hash table 82, linked-list(s) 84, tagging template(s) 86, and calling stack 88. These data structures will be described in further detail below.

In some embodiments, the specific software instructions, data structures and data that implement various embodiments of the present inventive technique are incorporated in the database management system 62. However, the present invention is not meant to be limited to use in database management systems, in other embodiments, the present inventive technique can be used in other applications for XML serialization. Generally, an embodiment of the present invention 62 is tangibly embodied in a computer-readable medium, for example, the memory 40 and is comprised of instructions which, when executed by the processor 32, cause the computer system 30 to utilize the present invention. The memory 40 may store a portion of the software instructions, data structures and data for any of the operating system 60, database management system 62 and database tables 64 in semiconductor memory, while other portions of the software instructions and data are stored in disk memory.

The operating system 60 may be implemented by any conventional operating system, such as z/OS® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation) and LINUX® (Registered trademark of Linus Torvalds).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over a network. The article of manufacture in which the code is implemented also encompasses transmission media, such as a network transmission line and wireless transmission media. Thus the article of manufacture may also comprise the medium in which the code is embedded. Those skilled in the art will recognize that many modifications may be made to this configuration without departing from the scope of the present invention.

The exemplary computer system illustrated in FIG. 1 is not intended to limit the present invention. Other alternative hardware environments may be used without departing form the scope of the present invention.

In the SQL/XML query language, an XMLELEMENT constructor creates an XML element; and the XMLFOREST constructor creates a forest of XML elements from a list of arguments. XML constructors, such as XMLELEMENT and XMLFOREST, can have XML namespace declarations inside them, using the XMLNAMESPACES constructor.

Namespaces are associated with a scope to which a namespace applies. Per the W3C Recommendation, "Namespaces in XML", REC-xml-names-19990114, Jan. 14, 1999, a namespace declaration applies to the element where the namespace declaration is specified and to all elements within the content of that element, unless overridden by another namespace declaration with the same prefix.

XML namespaces declared by the XMLNAMESPACES constructor are considered to be "in-scope" based on the syntactic boundary of the immediately enclosing constructor. A reference to a namespace prefix is valid if there is a corresponding namespace declaration that is in-scope.

FIG. 2 depicts exemplary SQL/XML constructors for an "emp" element, referred to as example one 90. The namespace prefix "hr" 92 is bound to the URI 94 in the outer XMLELEMENT constructor 95.

For example, the namespace prefix "hr" 92 is in-scope from the open parenthesis 96 following the first XMLELEMENT to the close parenthesis 98 at the end. There is no need to declare the namespace prefix "hr" in any of the inner XMLELEMENTs, since the "hr" namespace prefix with the XMLELEMENTS is declared within the scope of the namespace prefix "hr." In example one, conventional serialization does not produce redundant namespace declarations.

FIG. 3 depicts exemplary serialized XML text 100 for the exemplary constructor 90 of FIG. 2. A single "xmlns" declaration 102 for the prefix 92 and URI 94 is generated. The emp element has three sub-elements—empno, name and expertise. The three sub-elements are within the scope of the "hr" namespace declaration. The XML text 100 of FIG. 3 has no redundant namespace declarations.

In FIG. 3 and in subsequent examples of serialized XML text, namespace declarations and elements will typically be shown on different lines to improve readability. In practice, the serialized XML text may be a continuous stream without "carriage return/line feeds" at the end of the namespace and element declarations.

Using conventional processing for XML constructors, the same XML namespace declarations may be repeated many times in different places in the serialized XML text, because the sub-elements are not in each other's scopes.

FIG. 4 depicts an exemplary SQL/XML query 110, referred to as example two, which generates serialized XML text with multiple redundant namespace declarations when conventional serialization is used. The namespace prefix "hr" is declared in two different places, 112 and 114, since the containing constructors are not overlapping and they form different scopes. Reference numerals 116 and 118 depict a first scope, and reference numerals 122 and 124 depict a second scope.

FIG. 5 depicts exemplary serialized XML text 130 for data from one exemplary department number (deptno) for the exemplary query of FIG. 4. Using a conventional serialization technique, an initial namespace declaration for "hr" 132 and redundant, or superfluous, namespace declarations, 134, 136, and 138, are generated. In a worst case, almost every element can contain a redundant namespace declaration, which can result in the namespace declarations taking up more space than the data.

FIG. 6 depicts another exemplary constructor 140, referred to as example three, which uses a default namespace declaration 142. Default namespaces can be used to reduce the amount of space used by a prefix in XML elements. The exemplary constructor of FIG. 6 is a modified version of the exemplary constructor of FIG. 2.

FIG. 7 depicts exemplary serialized XML text 150 for data for one employee (emp) using the exemplary constructor of FIG. 6. The XML text does not have any prefixes.

FIG. 8 depicts an exemplary query 160, referred to as example four, in which a first query block or fragment 161 uses a default namespace declaration 162 with a scope defined by parentheses 164 and 166. A second query block or fragment, defined from parenthesis 167 to parenthesis 168, contains a scope defined by parentheses 169 and 170 that is not associated with any namespace. In example four, a list of projects is included with the data for each employee (emp). In particular, in the first query block 161, the XML element "emp" 172 is associated with the default namespace declaration 162. In the second query block, the XML element "proj" 174 is not associated with any explicitly declared namespace. Thus, the element "proj" does not belong to any namespace, in other words, it belongs to no namespace. Conventional serialization of the constructor of FIG. 8 will not correctly generate serialized XML text which will cause problems.

FIG. 9 depicts exemplary serialized XML text 180 for one employee, John Doec, for the exemplary query of FIG. 8 using a conventional serialization technique. In the serialized XML text of FIG. 8, the "proj" elements, 182 and 184, are in the default namespace 186 which is not correct because the "proj" elements should be in no namespace.

FIG. 10 depicts exemplary correctly serialized XML text 190 for the exemplary query of FIG. 8, which was generated by an embodiment of the present inventive technique. The serialized no default namespace declarations (xmlns=""), 192 and 194, are added by the embodiment of the present inventive technique. Adding the no-default namespace declarations, 192 and 194, effectively undeclares the default namespace declaration 186.

Referring back to FIG. 8, according to the rules of the SQL/XML language, within the scope defined by 169 and 170 in the second query block, there is no namespace declaration. This lack of a namespace is referred to as an implicit no default namespace. The namespace associated with a no default namespace is the "no namespace," which is associated with an empty prefix and an empty URI, ("", "").

FIG. 11 depicts an exemplary query 200 which adds an explicit namespace declaration to generate the correctly serialized XML text of FIG. 10. To generate the correctly serialized XML text, a user adds an explicit namespace declaration 202 to expressly undeclare the default namespace in the outer query block. The explicit "NO DEFAULT" namespace declaration 202 in the query is referred to as an explicit no-default namespace declaration.

When users explicitly specify either of the following two forms for a constructed XML element, then that XML element has an explicit no default namespace declaration. The two forms for a constructed XML element are:
(1) XMLNAMESPACES(NO DEFAULT) or
(2) XMLNAMESPACES (DEFAULT '').

Each XML namespace declaration has its own scope. When a constructed XML element is neither in the scope of a default namespace declaration nor in the scope of an explicit no default namespace declaration, it has no default namespace which is referred to as an implicit no default namespace.

Various embodiments of the present inventive technique generate correctly serialized XML text for both implicit and explicit no default namespaces. Some embodiments of the present inventive technique eliminate superfluous namespace declarations, including default namespace declarations, which saves space.

Some embodiments of the present inventive technique are applied to the XQuery language. A similar problem to that described with respect to FIGS. 8 and 9 also occurs in the XQuery language. In XQuery, namespaces are declared in a prolog. For simplicity, various embodiments of the present inventive technique will be described with respect to SQL/XML; however, other embodiments can be applied to the XQuery language as well as any SQL/XML serialization process.

Typically, processing comprises two phases—a compilation phase and an execution phase. In the compilation phase, the query is analyzed and an execution plan is built. In the execution phase, an object model, typically a tree, containing retrieved data is generated and serialized text is generated based on the object model.

Some of the problems described above may appear to be solvable during the compilation phase. That is, superfluous namespace declarations could be removed internally from a query after semantic checking. Superfluous namespace declarations are not removed during the compilation phase because rewriting the query during compilation alone cannot achieve the goal of canonicalization in cases where the same XML data containing a namespace declaration is referenced in two places and one reference has the namespace declared while the other does not. For one reference, the namespace declaration can be removed but not according to the other reference. Referring back to FIG. 4, for example, if the element X.emplist were referenced in an XMLELEMENT in the top SELECT block which did not have namespace "hr" declared, then the namespace declaration 114 inside XMLAGG cannot be removed. Using a copying technique, the constructor can be copied and replicated in the query block containing it, and the namespace declaration can be removed from one copy and kept in the other copy. However, the copying technique results in multiple evaluations of the same constructor, which incurs substantial execution time. Moreover, if the constructor contains non-deterministic functions or external actions, two copies will produce different results or side effects. Therefore, in general, making copies is undesirable.

In addition, the constructed XML data (in internal tree or other format), that is, the object model, should contain all the namespace declaration information. Removing namespaces from fragments or sub-trees too soon may cause semantic problems during processing of the data. Therefore, various embodiments of the present inventive technique do not remove namespace declarations during the compilation phase. In some embodiments, the present inventive technique performs pre-processing during the compilation phase to undeclare default namespaces as will be described below in further detail with reference to FIG. 13. Other embodiments, described below with reference to FIGS. 15A and 15B, remove superfluous namespace declarations and/or undeclare default namespaces based on the preprocessing during the execution phase.

FIG. 12 depicts a high-level flowchart of an embodiment of the processing phases. In the compilation phase, in step 204, the query is analyzed, preprocessing the query to identify implicit-no-default namespaces, and an execution plan is built. Typically, the compilation phase is performed by the query processor 66 (FIG. 1).

In the execution phase as indicated by dashed block 205, in step 206, the object model 78 (FIG. 1) containing the retrieved data is generated in accordance with the execution plan. The object model is a representation of the constructed data. In some embodiments, the object model is a tree. In other embodiments, the object model is a logical tree comprising templates with data records. In yet other embodiments, the object model is a well-known W3C Document Object Model, or, alternately, the XQuery data model.

Typically, the query processor 66 (FIG. 1) generates the object model as part of the query evaluation performed at execution time.

In step 208, serialized XML text is generated based on the object model. Typically, the serialization module 70 (FIG. 1) traverses the object model and generates serialized XML text. In some embodiments, default namespaces are undeclared in accordance with the identified implicit-no-default namespaces, and superfluous namespace declarations are eliminated.

Figure 13:
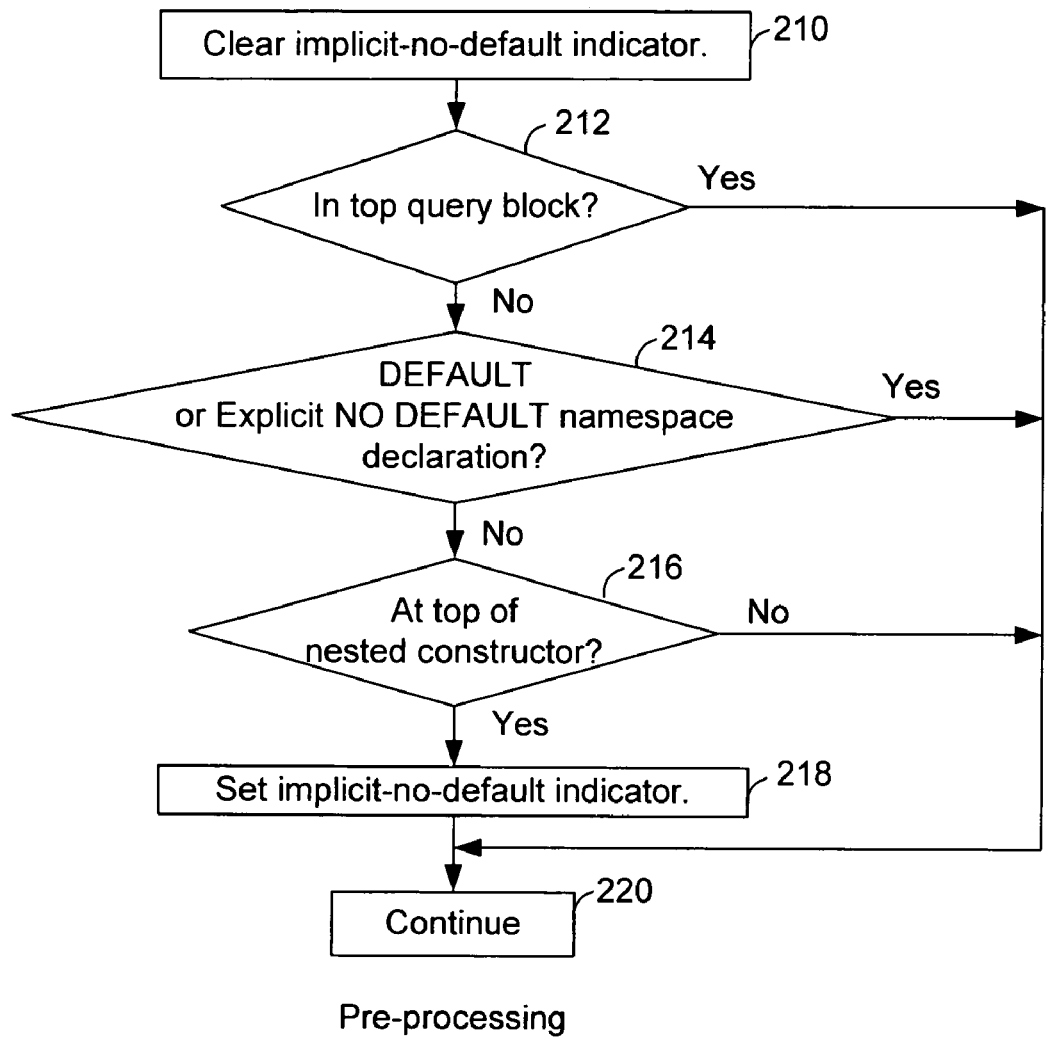
FIG. 13 depicts a flowchart of an embodiment of the pre-processing to identify implicit no default namespaces.

FIG. 13 depicts a flowchart of an embodiment of the pre-processing performed by various embodiments of the present inventive technique during the compilation phase in step 204 of FIG. 12. To undeclare a default namespace, an implicit no default namespace declaration is added to the top constructor of a scope if there is no explicit default or explicit no-default namespace declaration in that scope at compile time. However, if an implicit no default namespace occurs at the top constructor of a top query block, then no namespace declaration will be generated at serialization time. For this reason, no implicit no default namespace is identified for a top constructor of a top query block.

In various embodiments, the flowchart of FIG. 13 is applied in the compilation phase, during traversal of the parse tree of a query, when a constructor with potential namespace declarations is encountered. Alternately, the flowchart of FIG. 13 may be applied outside the compilation phase, but prior to invoking the serialization module.

In FIG. 13, the following steps are applied to an XMLELEMENT or XMLFOREST constructor. In some embodiments, an XMLFOREST declaration is converted into an equivalent list of XMLELEMENTs. In step 210, an implicit-no-default indicator is cleared. The implicit-no-default indicator is associated with the constructor and will be used to indicate whether there is an implicit no default namespace associated with the constructor. Step 212 determines whether the constructor is at the top query block. When the constructor is not at the top query block, step 214 determines whether the constructor has an explicit default or an explicit no-default namespace declaration. When the constructor does not have an explicit default or an explicit no-default namespace declaration, step 216 determines whether the constructor is at the top of a nested constructor. When step 216 determines that the constructor is at the top of a nested constructor, 218, the implicit-no-default indicator is set for that constructor. In step 220, the pre-processing continues.

When step 212 determines that the constructor is in the top query block, the processing continues to step 220. When step 214 determines that the constructor does have an explicit DEFAULT or explicit NO DEFAULT namespace declaration, the processing continues to step 220. When step 216 determines that the constructor is not at the top of a nested constructor, processing continues at step 220.

For example, referring also to FIG. 11, if the NO DEFAULT namespace declaration 202 were removed, the pre-processing would identify that there should be an implicit no default namespace.

In an alternate embodiment, in step 218, a no default namespace is also added to provide an implicit no default namespace. The no default namespace is represented as a namespace having an empty prefix and empty URI.

In yet another embodiment, for a namespace with an expressly declared prefix, the implicit-no-default indicator is not set. Alternately, for a namespace with an expressly declared prefix, the implicit-no-default indicator is set, and subsequently ignored for the expressly declared prefix during serialization. In some embodiments, the implicit-no-default indicator is a flag.

Figure 14:
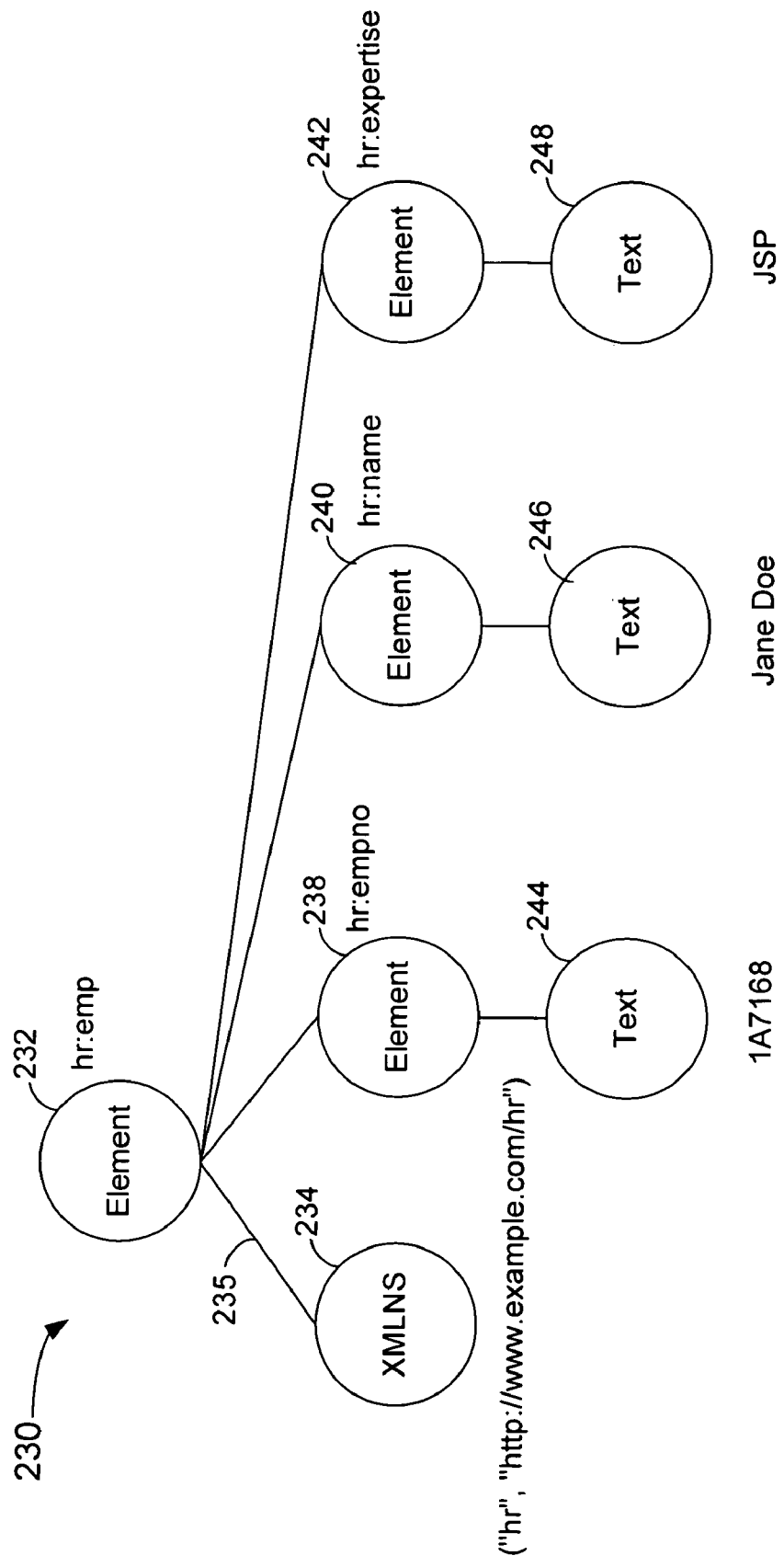
FIG. 14 depicts an exemplary tree representation of data retrieved in accordance with the exemplary SQL/XML constructor of FIG. 2.

FIG. 14 depicts an exemplary tree 230, which contains constructed XML data in accordance with an object model, for the constructor and data of example one of FIGS. 2 and 3. The tree is comprised of nodes and branches. In FIG. 14, a node is represented as a circle, and a branch is a line that connects nodes. The type of node is labeled inside the circle. The starting or root node 232 is an element node for the "hr:emp" element. A namespace declaration node, denoted by XMLNS, 234 is associated with element node 232, as shown by branch 235. A pair (prefix, URI) that contains the prefix and the namespace URI is associated with the namespace declaration node 234. Three additional element nodes, 238, 240 and 242 for the "hr:empno," "hr:name," and "hr:expertise" elements, branch from the "hr:emp" element node 232. The root node 232 is a parent node, and the three element nodes 238, 240 and 242 are children of the root node. The three additional element nodes, 238, 240 and 242, branch from the "hr:emp" element node 232, and are associated with text nodes 242, 246 and 248, respectively. The retrieved data is shown below the text node.

Figure 15A:
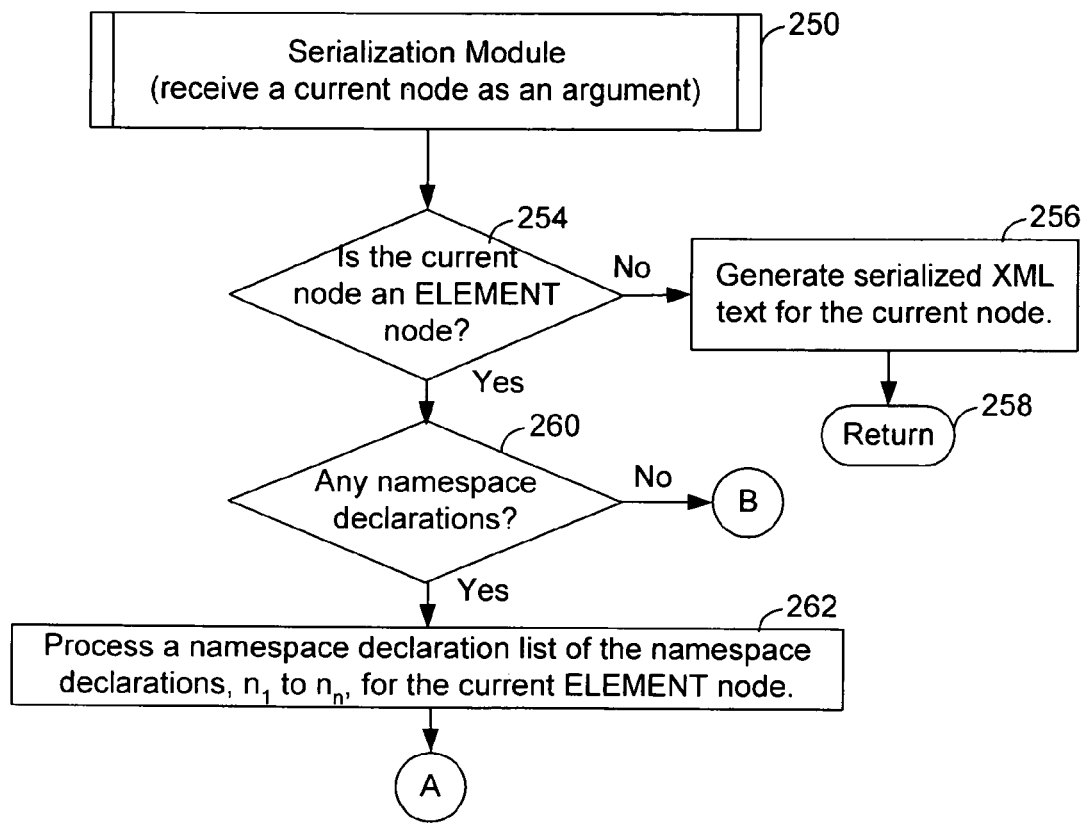
FIGS. 15A and 15B collectively depict a flowchart of an embodiment of a technique to eliminate redundant or superfluous namespace declarations and to undeclare inherited default namespaces for fragments or sub-trees which are constructed without a default namespace.
Figure 15B:
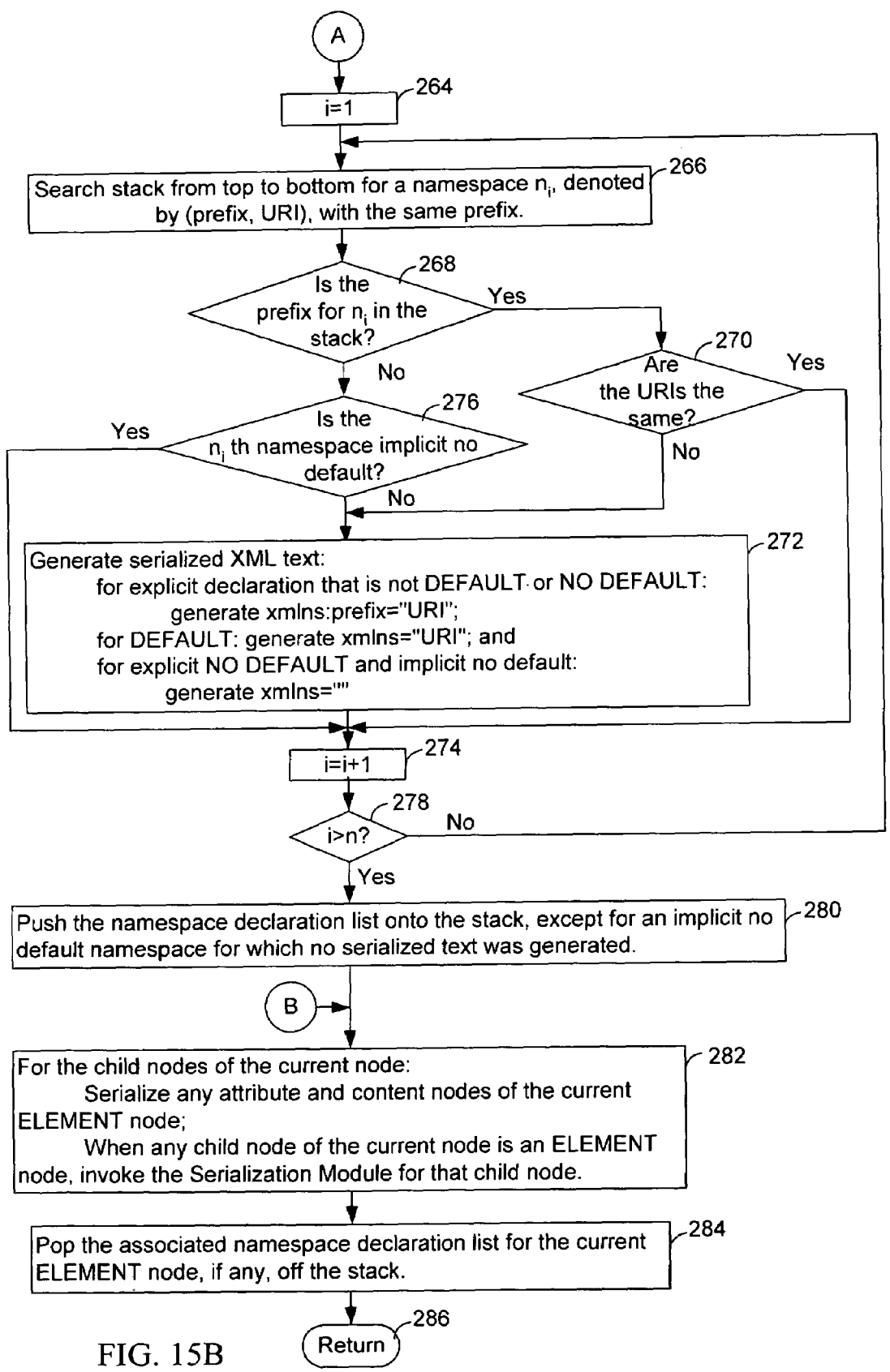

FIGS. 15A and 15B collectively depict a flowchart of an embodiment of a technique, used at execution time, which eliminates redundant or superfluous namespace declarations and undeclares inherited default namespaces for fragments or sub-trees of an object model which are constructed without a default namespace. The serialization module of FIG. 1 typically implements an embodiment of the technique of FIGS. 15A and 15B.

In some embodiments, the stack 80 (FIG. 1) is used to store the namespace scoping. Various embodiments of the present inventive technique will now be described with respect to the stack. In some embodiments, the technique of FIGS. 15A and 15B is applied to a tree that contains the retrieved data in accordance with a query, for example, the tree of FIG. 14. During serialization the tree is traversed in pre-order. Typically, when a new element is processed, namespace declarations associated with the element are pushed onto the stack, as a list of pairs comprising the prefix and URI for the namespaces, (prefix, namespace URI).

During the execution phase, logically, the stack stores in-scope namespace declarations. The stack is searched for a current namespace prefix from the top to the bottom. If the same namespace prefix as the current namespace prefix appears in the stack, the namespace prefix closer to the top of the stack overrides the namespace prefix closer to the bottom of the stack. When a namespace declaration is encountered, whether to generate the namespace declaration in the serialized XML text depends on whether the same namespace declaration is in-scope. When the same namespace appears in-scope, the current namespace declaration is superfluous, and serialized XML text is not generated. When the same namespace is not in-scope, various embodiments determine if the namespace declaration is an implicit no default namespace. For an implicit no default namespace, a serialized namespace declaration is not generated. For any other namespace declaration, a serialized namespace declaration is generated. After the processing for an element is completed, when leaving the element, any associated namespace declaration entries for that element in the stack are popped off. If an element has no namespace declaration, the namespace declaration entry for that element in the stack will be an empty list.

To maintain in-scope namespaces, when an element is encountered, a namespace declaration list associated with the element is pushed onto the stack. An empty list is pushed if there are no namespace declarations for the element. The namespace declaration list is typically represented by a list header, followed by a list of prefix and URI pairs. An empty namespace declaration list has a header without any prefix and URI pairs. When the serialization for the element is complete, that is, an end of element, or end-tag has been output as serialized XML text, the namespace declaration list associated with that element is popped off the stack.

In FIG. 15A, in block 250, the serialization module is invoked and a current node is passed as an argument. Initially, the current node is the root node.

Step 254 determines whether the current node is an ELEMENT node. When step 254 determines that the current node is not an ELEMENT node, in step 256 serialized XML text is generated for the current node, and in step 258 returns to the invoking module. When step 254 determines that the current node is an ELEMENT node, step 260 determines whether any namespace declarations are associated with the current ELEMENT node. For example, referring back to FIG. 13, the namespace declaration associated with an element is shown as a separate node; however, the processing for a namespace node is performed with the processing of the namespace node's associated ELEMENT node. In some embodiments, the namespace node may not be considered to be a node in the same sense as other nodes.

When step 260 determines that a namespace declaration is associated with the ELEMENT node, in step 262, a namespace declaration list of the namespace declarations, $n_i$ to $n_n$, for the element node is retrieved. The process continues via continuator A to step 264 of FIG. 15B.

In FIG. 15B, in step 264, a counter, i, is set equal to one to reference the first namespace declaration in the namespace declaration list. The counter is used to track the namespace declaration that is being processed from the namespace declaration list. The current namespace declaration being processed is referred to as namespace declaration $n_i$. One of the namespaces in the namespace declaration list may be an implicit no default namespace with the implicit-no-default indicator from the pre-processing.

In step 266, the stack is searched from top to bottom for a namespace declaration having the same prefix as namespace declaration $n_i$. For the search, an implicit no default namespace or an explicit no default namespace declaration is considered to be the empty namespace ("", ""). When an explicit default namespace is encountered, the prefix for that namespace is the empty prefix, "". In some embodiments, the implicit-no-default indicator associated with the current namespace is checked to identify an implicit no default namespace. The search ends when a prefix matching the prefix for namespace declaration $n_i$ is found or when the entire stack has been searched without finding a matching prefix for namespace declaration $n_i$. Step 268 determines whether the prefix for namespace declaration $n_i$ is in the stack. In another embodiment, steps 266 and 268 are combined.

When step 268 determines that the prefix for namespace declaration $n_i$ is in the stack, step 270 determines if the URI associated with the prefix in the stack is the same as the URI for namespace declaration $n_i$.

When step 270 determines that the URI associated with the prefix for namespace declaration $n_i$ is not the same as the URI associated with the prefix in the stack, in step 272, serialized XML text is generated. When the namespace declaration is not DEFAULT or NO DEFAULT, the following text stream is generated: xmlns:prefix="URI". When the namespace declaration is DEFAULT, the following text stream is generated: xmlns="URI". When the namespace is explicit NO DEFAULT or implicit no default, the following text stream is generated: xmlns="". In step 274, the counter i is incremented by one to reference the next namespace declaration in the namespace declaration list.

When step 270 determines that the URI associated with the prefix in the stack is the same as the URI for namespace declaration $n_i$, the process continues to step 274, and no serialized XML text is generated. In this way, superfluous namespace declarations are not generated.

When step 268 determines that the prefix for namespace $n_i$ is not in the stack, step 276 determines whether the namespace $n_i$ is an implicit no default namespace. In various embodiments, the serialization module determines whether a namespace is implicit no default when the implicit-no-default indicator is set. When step 276 determines that namespace $n_i$ is an implicit no default namespace, step 276 proceeds to step 274 and no serialized XML text is generated because there is no DEFAULT namespace in scope to undeclare.

When step 276 determines that namespace declaration $n_i$ is not an implicit no default namespace, in step 272, serialized XML text is generated.

Step 278 determines whether the value of the counter i is greater than the value of n, where n represents the number of namespace declarations in the namespace declaration list. In other words, step 278 determines whether all the namespace declarations in the namespace declaration list for an element have been processed. When the value of i is less than or equal to the value of n, step 284 proceeds to step 266 to process the next namespace declaration in the namespace declaration list. Although the processing of the namespace declaration list has been described with respect to a counter, other well-known list processing techniques could be used. For example, each element in the namespace declaration list could be associated with a pointer to the next element in the namespace declaration list and an end-of-list indicator could be used to mark the end of the namespace declaration list.

In step 280, the namespace declaration list typically is pushed onto the stack. However, an implicit-no-default namespace for which no serialized text was generated is not pushed onto the stack. In some embodiments, another indicator, for example, a text-generated indicator, indicates whether serialized text was generated for the implicit no default namespace. In these embodiments, the text-generated indicator is set in step 272 after the serialized text is generated, and step 280 pushes the text-generated indicator on the stack as part of the namespace declaration list. In this way, the stack is used to store the ancestor namespace declarations for an element.

In step 282, for the child elements of the current node, any attribute and content nodes associated with the current ELEMENT node are serialized. To serialize any child elements, the traversal of the object model is in pre-order. In some embodiments, the object model is a tree which will be traversed starting at the current node and proceeding from left to right for the child nodes. Processing will be completed on a left sub-tree or node prior to processing the node to the right. When any child node of the current node is an ELEMENT node, the serialization module is invoked for that child element. In this way, the serialization process is recursive.

When step 282 completes, the child nodes of the current node will have been processed, serialized text for an end tag for the element node will have been generated, it is time to leave the current node. In step 284, the associated namespace declaration list for the current ELEMENT node, when previously pushed onto the stack, is popped off the stack. In some embodiments that use a text-generated indicator, step 284 will pop off the namespace declaration list with a text-generated indicator in it from the stack. In step 286, the serialization module returns to the invoking module. Because the serialization module is invoked recursively, the return ends the current invocation of the serialization module.

When step 260 of FIG. 15A determines that a namespace declaration is not associated with the ELEMENT node, processing continues via continuator B to step 282 of FIG. 15B.

Typically, in FIGS. 15A and 15B, the serialization process is recursive and begins at the root node. The sub-elements of an ELEMENT are processed prior to completing the processing for that ELEMENT. In some embodiments, for example, except for a namespace node, the serialization module is invoked each time a new node is to be processed.

In another alternate embodiment which uses the text-generated indicator, in step 266, when searching through the ancestor namespaces in the stack for a matching prefix, when the text-generated indicator associated with an implicit default namespace is not set, the search skips that namespace.

An embodiment of the undeclaring of default namespaces will now be described. A no default namespace, both explicit and implicit, is represented as an empty pair (""", """); and, therefore, the following text stream is generated: xmlns=""". A default namespace has an empty prefix, """. If a parent, or alternately, an ancestor, node has a default namespace, in the stack, the namespace declaration list for the parent node will contain an empty prefix """, and a non-empty URI. If the child element node has an implicit-no-default namespace, as indicated by the implicit-no-default indicator, in step 266, the stack is searched for an empty prefix. In this example, the empty prefix is found in step 268, and step 270 determines whether the URIs are the same. In this example, the implicit-no-default namespace is associated with an empty URI, while the empty prefix on the stack is associated with a non-empty URI. Therefore step 270 continues to step 272 and the following serialized text is generated: xmlns=""". In this way, default namespaces are undeclared.

Referring back to FIG. 14, for example, a representation of the tree 230 is received. The stack is empty. Starting at the root node 232, processing starts with the leftmost branches before proceeding to the right. The root node 232 is an element node which has an associated namespace declaration as shown by the node 234 labeled "xmlns".

Since the root node 232 is an element node, serialized XML text for a start tag is generated as follows: <hr:emp. Since there is a namespace declaration node 234 associated with the element node 232, a namespace declaration list containing the one namespace declaration is generated. In this example, the namespace declaration list has one entry. The stack is searched for the namespace declaration. Since the stack is empty, the prefix and URI for the node is not in the stack, and the namespace declaration is not an implicit no default namespace. Therefore, serialized XML text is generated using the prefix and URI. The counter i is incremented by one. Since the value of the counter i (2) is greater than the value of n (1), the namespace declaration, (prefix, URI), is pushed onto the stack. Any attribute and content nodes associated with the element node 232 are serialized.

The next node to process is the element node for "hr:empno" 238 which has an associated text node 244. Since there is no associated namespace declaration (step 264) the following XML text is generated: <hr:empno>1A7168</hr: empno>. The "hr:name" and "hr:expertise" element nodes, 240 and 242, respectively, are similarly processed. After the "hr:expertise" node 242 is processed, since there are no more nodes to process for this "hr:emp" element 232, the associated namespace declaration for the "hr:emp" node is popped off the stack, and since there are no further nodes to process for 232, an end-tag is generated as follows: </hr: emp>. The process ends.

Figures 16, 17:
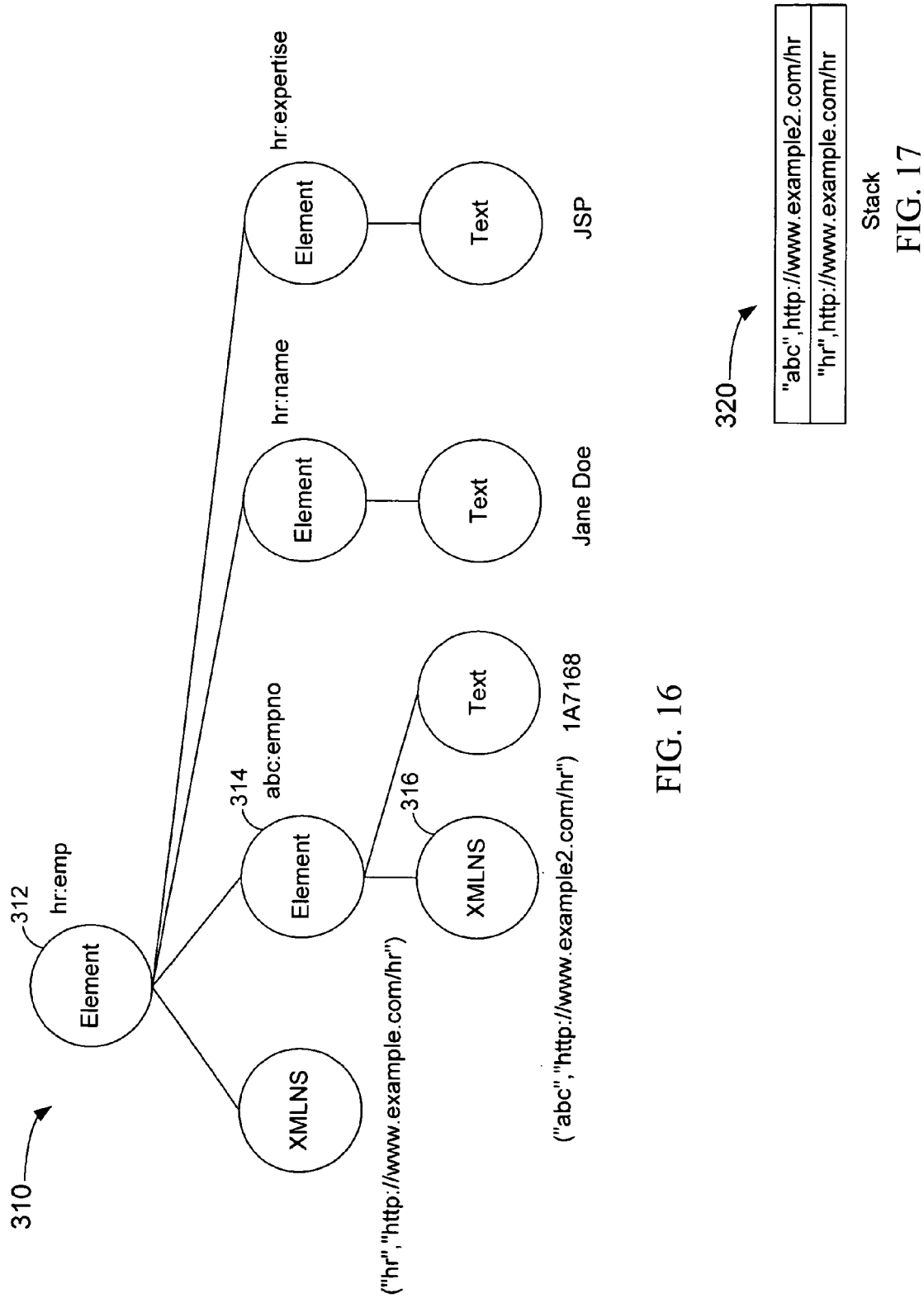
FIG. 16 depicts another example, based on the tree of FIG. 14, which has a second namespace declaration in a sub-tree.
FIG. 17 depicts an exemplary stack that is used to store the namespace declarations of FIG. 16.

FIG. 16 depicts a tree 310 similar to the tree of FIG. 14. The tree of FIG. 16 is processed in a similar manner to FIG. 14, except for the sub-tree associated with the "abc:empno" node 312. The "abc:empno" node 312 has an associated namespace declaration node 314 which is for a different namespace from the ancestor namespace. Therefore, a serialized XML namespace declaration is generated with the new prefix and new URI. The new prefix and URI pair is also pushed onto the stack. When the processing for the "abc:empno" node 312 ends, the stack is popped to remove the new prefix and URI pair from the stack.

FIG. 17 depicts an exemplary stack 320 illustrating the pushed prefix and URI pairs for the namespaces associated with the hr:emp and abc:empno elements.

A Template-based Technique

In various embodiments, a tagging template is used to represent an element, and to form a chain of ancestor declarations rather than the stack. U.S. patent application Ser. No. 10/325,781 teaches a method that uses tagging templates to represent the structures of the nested constructors, and intermediate records for the input data. Commonly assigned U.S. patent application Ser. No. 10/325,781, titled, "Method, system, and program for optimizing processing of nested functions," is incorporated herein by reference in its entirety as background information. Another embodiment of the present inventive technique provides a new template structure for XML namespaces.

Figures 18, 20:
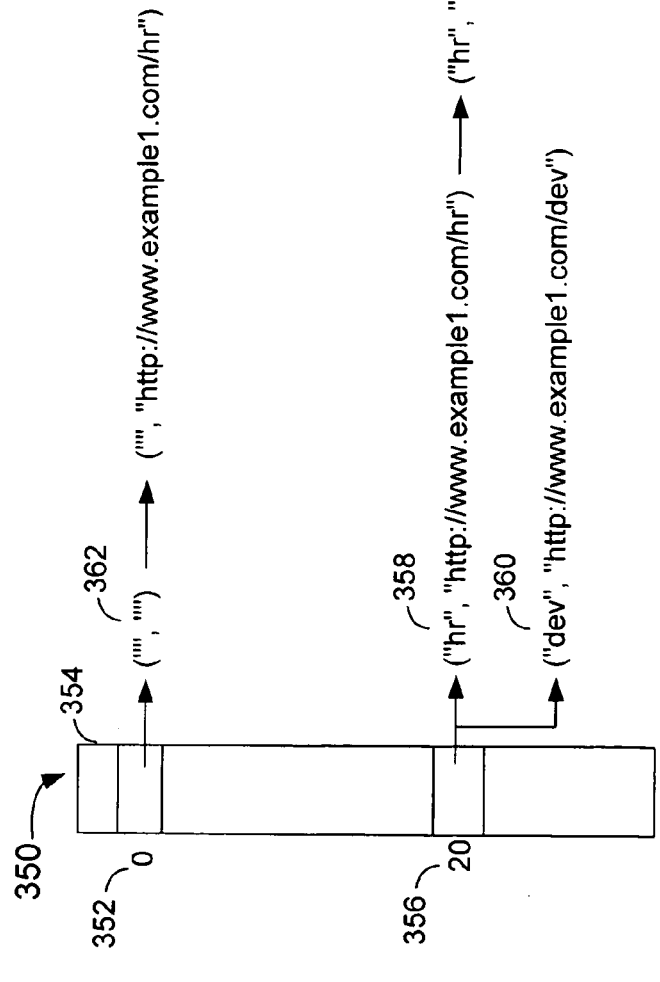
FIG. 18 depicts exemplary constructors, referred to as example six.
FIG. 20 depicts an example of yet another embodiment of the present inventive technique which works with the flowchart of FIGS. 15A and 15B, and uses a hash table to store and order namespace declarations.

FIG. 18 depicts exemplary constructors 330, referred to as example six.

Figures 19A, 19B:
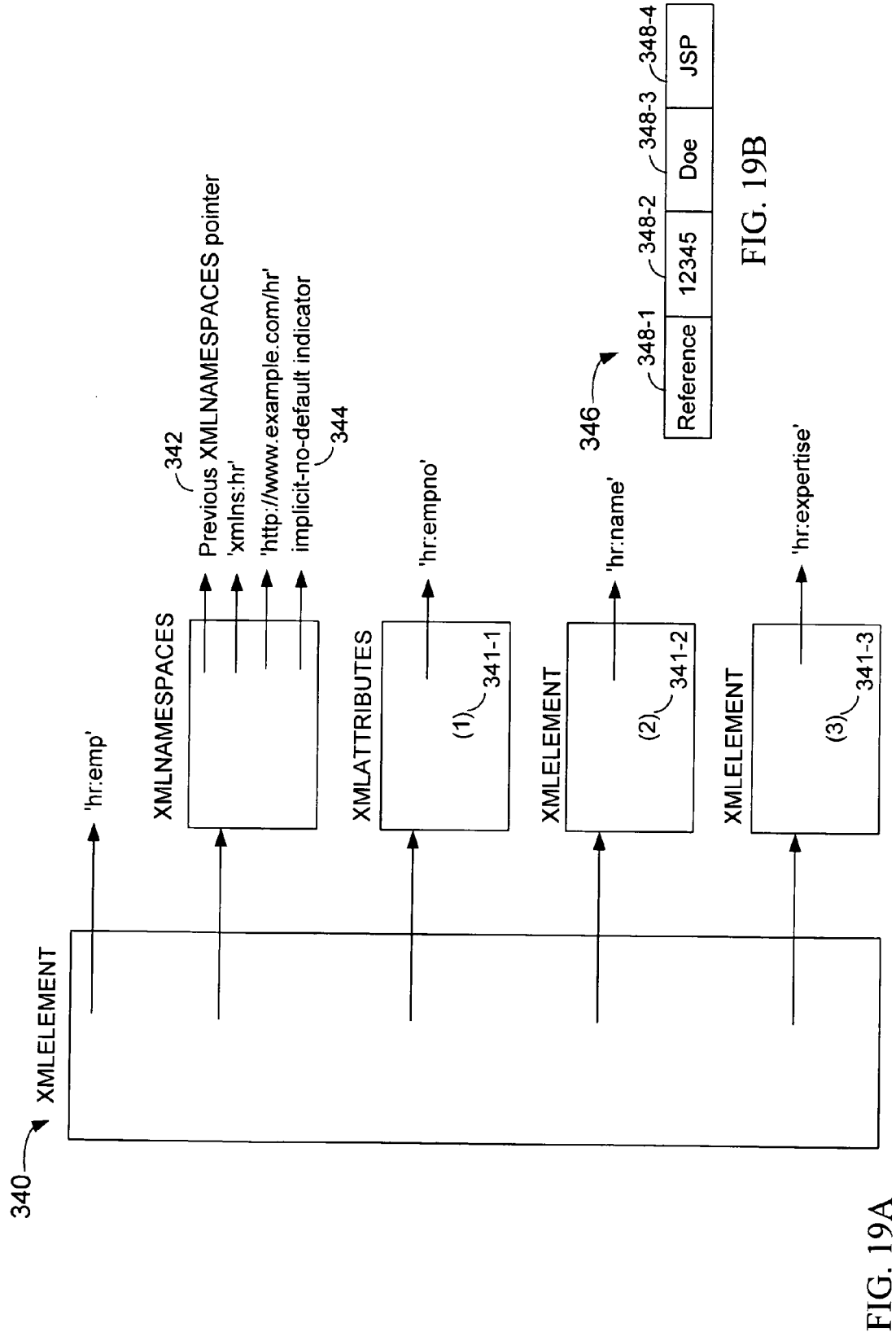
FIG. 19A depicts an example of another embodiment of the present inventive technique, which works with the flowchart of FIGS. 15A and 15B, and uses a template with a pointer to a namespace declaration in another template to track namespace declarations.
FIG. 19B depicts an exemplary intermediate record containing data associated with the tagging template of FIG. 19A.

FIG. 19A depicts an embodiment of the associated tagging template 340 for the constructors 330 of FIG. 18. In various embodiments, a tagging template represents an element, and an intermediate record contains data, for example, retrieved data, which is used to populate the tagging template. The numbers in parentheses, 341-1, 341-2 and 341-3, refer to an associated data field within an intermediate record containing the retrieved data.

Referring also to FIG. 19B, an exemplary intermediate record 346 containing data associated with the tagging template 340 is depicted. The intermediate record 346 has a reference 348-1 to the tagging template 340. The intermediate record also has data fields 348-1, 348-2 and 348-3 corresponding to the numbers 341-1, 341-2 and 341-3, respectively, of the tagging template 340.

In various embodiments, the tagging templates form a logical tree. During traversal of the tree in FIGS. 15A and 15B, a tagging template is treated as a node or a sub-tree of nodes.

In another embodiment of the flowchart of FIGS. 15A and 15B, for the template-based implementation of the constructors, the template 340 has a pointer 342 to a previous XMLNAMESPACES template structure. The pointer 342 is used to create a chain of ancestor namespace declarations, rather than using the explicit stack. The template-based technique avoids the use of a stack which uses dynamic memory management. The template-based technique also avoids processing empty namespace declaration lists. Empty namespaces are skipped because they are not in the chain. In the template-based technique, a head pointer to the current XMLNAMESPACES template structure provides the top entry to the chain, and the list formed by the previous pointers provides all the in-scope namespace declarations.

In other embodiments, to use the tagging template, the flowchart of FIGS. 15A and 15B is modified. In the embodiment using the tagging template, in step 266 of FIG. 15B, the technique searches for an ancestor namespace declaration using the pointer 342 to search through the chain. In step 262 of FIG. 15B, when processing an XMLELEMENT template, if there is an associated XMLNAMESPACES template, its pointer to a previous XMLNAMESPACES template structure is set to a head pointer and the head pointer points to the current XMLNAMESPACES template, to equivalently push the current namespace declaration list, rather than using the stack. In step 284 of FIG. 15B, when other templates associated with the XMLELEMENT have been serialized, and the XMLELEMENT is being left, the head pointer is set to the previous pointer, to equivalently pop off the current namespace list. Since the template is possibly to be reused, the previous pointer is also reset to zero.

In another embodiment, during the pre-processing of FIG. 13, an implicit-no-default indicator 344 is set in the XMLNAMESPACES template, or alternately the XMLELEMENT template, to indicate that there is an implicit no default namespace declaration. In some embodiments, in step 266, of FIG. 15B, the implicit-no-default indicator of the current namespace is checked to identify an implicit no default namespace. In step 276 of FIG. 15B, the implicit-no-default indicator of the template is checked for an implicit no default condition. Typically, the implicit-no-default indicator is a flag.

A Hashing Technique

In another embodiment, the hash table 82 (FIG. 1) and linked list(s) 84 (FIG. 1) are used to efficiently maintain and search in-scope ancestor namespaces. In an embodiment for constructors without tagging templates, or in an embodiment that constructs tree instances conforming to the XQuery or Document Object Model (DOM) data model, no templates exist, and nodes corresponding to XML element, XML namespace, XML attribute and Text are used. For example, the DOM is described in W3C, "Document Object Model (DOM) Level 1 Specification", version 1.0, W3C Recommendation 1, October, 1998, REC-DOM-Level-1-19981001. In other embodiments, the template-based technique described above is used with the hashing technique.

FIG. 20 depicts an exemplary hash table and linked lists 350. In the hash table, a namespace prefix is hashed to an index 352 of a hash anchor array 354. If two namespace prefixes are hashed to the same index 356, either the namespace prefixes are the same, or the namespace prefixes are different and a collision has occurred. A separate linked list, 358 and 360, is maintained for each prefix. The first linked list 362 is for the empty prefix, " ". The second entry 356 of the table is associated with two linked lists 358 and 360. One linked list 358 is for the "hr" prefix, and the other linked list 360 is for the "dev" prefix.

In various embodiments using the hash table, the flowchart of FIGS. 15A and 15B is modified. In step 266 of FIG. 15A, the current prefix is hashed to provide a hash index into the hash table. A linked-list associated with the hash index, if any, is searched. When searching for a prefix, the closest to the head, that is, the most recent, in-scope prefix is retrieved. In step 280 of FIG. 15B, insertion of a new (prefix, URI) pair into a linked list is always at the link head. In step 284 of FIG. 15B, when deleting a namespace declaration, an entry is removed from the list head.

One of the advantages of the hashing technique is efficient lookup, especially when there are a large number of namespaces. Otherwise, a stack may be similarly efficient.

Recursive SQL/XML queries

The template-based technique described above does not apply to SQL/XML queries with constructors in recursion. Various embodiments of a technique will be described below to process XML functions with namespace declarations in recursive queries using a template-based approach, and these techniques also process non-recursive queries.

FIG. 21 depicts an exemplary recursive SQL/XML query 350. This query 350 uses the recursive feature to construct some XML of nested structure to illustrate the recursion. As the comments in the query pointed out, recursion part 1 and part 2, 352 and 354, respectively, can cause recursion. The template-based technique described above can retain previous namespace declarations, but that is not sufficient for recursion, since the same tagging templates will be used repeatedly, and the pointers to a previous template will be overwritten. Direct implementation of a stack as described in the general logic will work, but involves explicit dynamic memory allocation. The following embodiments of a technique employ a local automatic structure variable in the recursive serialization module, which is allocated and de-allocated as part of the calling stack 88 (FIG. 1). In various embodiments, the serialization module is recursive and invoked whenever an element tagging template is encountered, for example, in step 282 of FIG. 15B. XMLNamespaces will be anchored from XMLELEMENT. The local structure variable maintains a pointer to the XMLELEMENT/XMLNAMESPACES in the tagging template, and a pointer to the previous local structure. The pointer to the previous local structure is passed as a parameter to the serialization module.

FIG. 22 depicts an embodiment of the exemplary local structure 360 which has a pointer 362 to the XMLELEMENT/XMLNAMESPACES in the tagging template, and a pointer 364 to previous local structure. In some embodiments, the local structure 360 also has a text-generated indicator that indicates that serialized text was generated for at least one namespace associated with the local structure. The following exemplary code illustrates the use of the local structure 360.

myxmlnsentry.prev=prevptr; /* prevptr is the address of previous xmlnsentry, i.e. */
/* the address of myxmlnsentry passed in by caller */

Using the local structure 360, local variables from the calling stack are formed into a linked list, just like a stack. A pointer to the local structure 360 is passed as an argument to the serialization module when the serialization module is invoked, with the pointer being equal to zero for an initial call.

Figure 23:
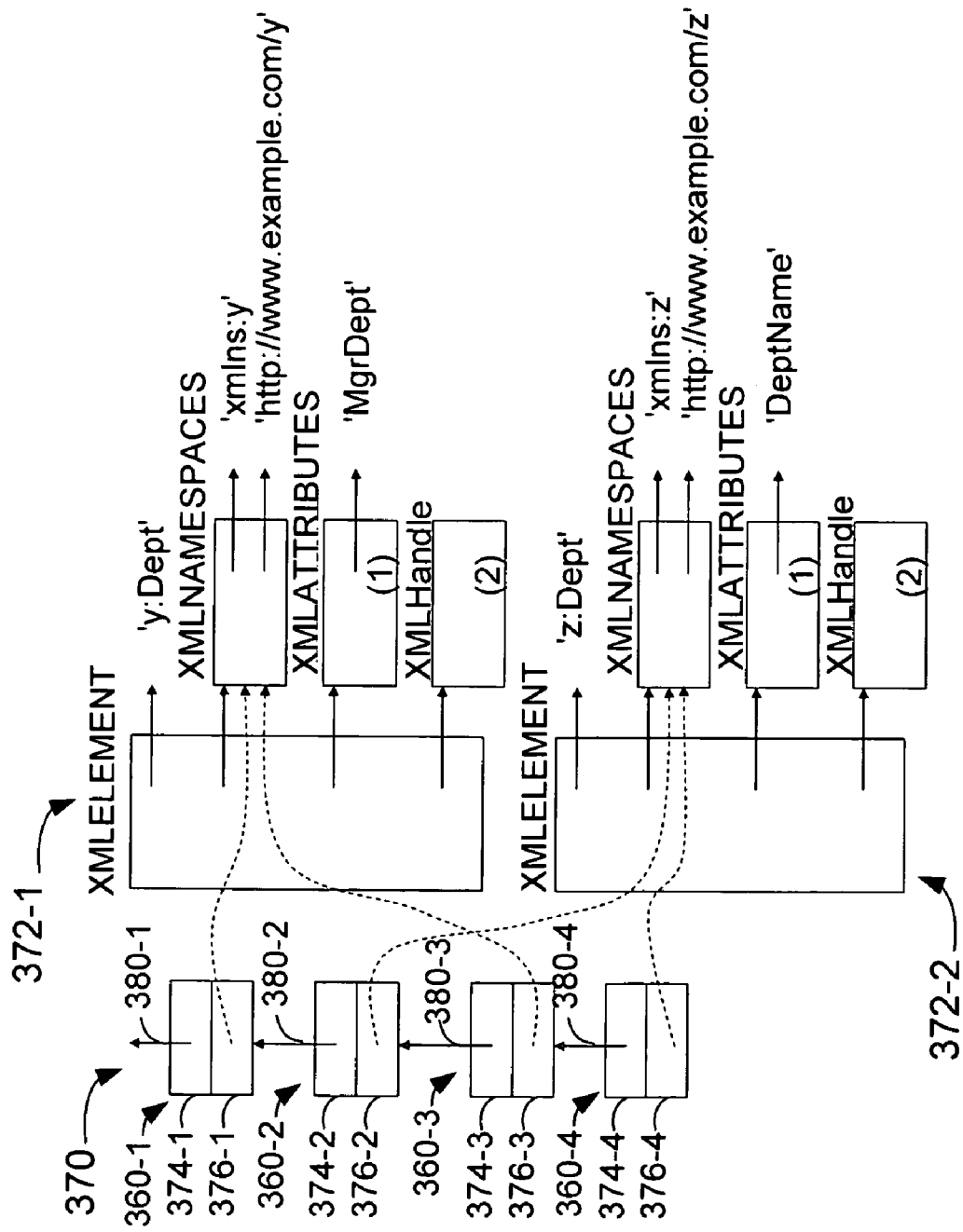
FIG. 23 depicts an example of another alternate embodiment of the present inventive technique, which works with the flowchart of FIGS. 15A and 15B, and uses templates and a calling stack which contains the data structure of FIG. 22, to track namespace declarations.

FIG. 23 depicts an exemplary representation of a calling stack, also referred to as a linked-list stack, 370 and templates 372-1 and 372-2 with recursion. Referring also to FIG. 21, assume that the sequence of recursions generated by the query 350 is part 2 in part 1 in part 2 in part 1. The linked-list stack 370 is formed by the same local structure in the recursive serialization module. When returning from the serialization module, the local structure in the linked-list stack 370 will be popped off automatically. No explicit stack is used for the namespace declarations. Therefore, in FIG. 15B, step 284 is omitted. The sequence of namespace declarations is contained in the calling stack 370 of the recursive serialization module, thus saving memory allocation logic and cost. The search of namespace declarations is performed on the linked-list stack 370.

In the local structures 360 of the linked-list stack 370, a structure pointer field 374 has the pointer to the previous local structure, and a namespace pointer field 376 has the pointer to XMLNAMESPACES in the tagging template. Local structure 360-1 is close to the bottom of the stack, and local structure 360-4 is at the top of the stack. The arrows 380 represent the order in which the structures were created and linked. This structure allows namespace prefix search to be performed equivalently.

In various embodiments using the calling stack, FIGS. 15A and 15B are modified. In step 266 of FIG. 15A, the calling stack is searched for an ancestor prefix that matches the current prefix using with the pointer to the local structure that was received when the serialization module was invoked. When no ancestor prefix match is found, the pointer to the previous local structure is retrieved from the local structure, and the namespace associated with the previous local structure is checked. In this matter, the chain of previous local structures can continue to be accessed until a match is found or the entire calling stack is searched. In step 280 of FIG. 15B, a current local structure is initialized. Structure pointer field 374 of the current local structure is set equal to the pointer that was received when the serialization module was invoked. Namespace pointer field 376 is set to point to XMLNAMESPACES in the current tagging template. In step 282, when the serialization module is invoked, a pointer to the current local structure is also passed as an argument. Because the calling stack is automatically popped when returning from an invocation of the serialization module, step 284 of FIG. 15B is omitted.

In another embodiment in which the serialization module is implemented as an iterative procedure, a stack is used to keep track of nested tagging templates, and that stack can also contain the "local" structure variable for the namespaces.

The foregoing description of the preferred embodiments of the inventions has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A method of performing serialization of at least a portion of an object model comprising at least one namespace, comprising: preprocessing a query to identify any implicit no default namespaces, wherein the object model is associated with the query; searching for an ancestor namespace based on a current namespace, the ancestor namespace being associated with an ancestor prefix and an ancestor uniform resource identifier (URI), the current namespace being associated with a current prefix and current URI, such that the ancestor prefix matches the current prefix; and when the current namespace is an implicit no default namespace and the ancestor namespace is an explicit default namespace based on, at least in part, the ancestor prefix, generating a serialized namespace declaration for the current namespace.

2. The method of claim 1 wherein the serialized namespace declaration is a serialized XML namespace declaration.

3. The method of claim 1 wherein a stack stores the ancestor namespaces, and said searching searches the stack for the ancestor prefix, and further comprising: pushing the current prefix and current URI onto the stack.

4. The method of claim 1 further comprising: when no ancestor namespace has an ancestor prefix that matches the current prefix, or when an ancestor namespace matches the current prefix and the ancestor URI is different from the current URI, generating a serialized namespace declaration for the current namespace.

5. The method of claim 1 wherein said generating generates the serialized namespace declaration when the implicit no default namespace is not a top constructor at the top query block, wherein the serialized namespace declaration is a no default namespace.

6. The method of claim 1 wherein the object model comprises at least one element, and a current tagging template represents the element, the tagging template having a pointer to a previous namespace declaration in an ancestor tagging template, wherein said searching searches for the ancestor namespace using the pointer.

7. The method of claim 6 wherein the tagging template further comprises an implicit-no-default indicator to indicate that a namespace declaration is implicit no default, and wherein said generating generates the serialized namespace declaration for the implicit no default namespace when the implicit-no-default indicator indicates that the current namespace is implicit no default.

8. The method of claim 1 further comprising: hashing the current prefix to an index of a hash anchor array, wherein said searching accesses the hash anchor array for the ancestor namespace.

9. The method of claim 1 further comprising: passing a template-chaining data structure comprising a pointer to a previous template-chaining data structure and also comprising a pointer to a namespace of a template, wherein said searching uses said template-chaining data structure to find the ancestor namespace declaration.

10. A computer readable medium embodying one or more instructions executable by a computer for performing a method of serializing at least a portion of an object model comprising at least one namespace, the method comprising: preprocessing a query to identify any implicit no default namespaces, wherein the object model is associated with the query; searching for an ancestor namespace based on a current namespace, the ancestor namespace being associated with an ancestor prefix and an ancestor uniform resource identifier (URI), the current namespace being associated with a current prefix and current URI, such that the ancestor prefix matches the current prefix; and when the current namespace is an implicit no default namespace and the ancestor namespace is an explicit default namespace based on, at least in part, the ancestor prefix, generating a serialized namespace declaration for the current namespace.

11. The computer readable medium of claim 10 wherein the serialized namespace declaration is a serialized XML namespace declaration.

12. The computer readable medium of claim 10 wherein a stack stores the ancestor namespaces, said method further comprising: pushing the current prefix and URI onto the stack, wherein said searching searches the stack for the ancestor prefix.

13. The computer readable medium of claim 10, said method further comprising: when no ancestor namespace has an ancestor prefix that matches the current prefix, or when an ancestor namespace matches the current prefix and the ancestor URI is different from the current URI, generating a serialized namespace declaration for the current namespace.

14. The computer readable medium of claim 10 wherein said generating generates the serialized namespace declaration when the implicit no default namespace is not a top constructor at a top query block, wherein the serialized namespace declaration is a no default namespace.

15. The computer readable medium of claim 10 wherein the object model comprises at least one element, and a current tagging template represents the element, the tagging template having a pointer to a previous namespace declaration in an ancestor tagging template, wherein said searching searches for the ancestor namespace using the pointer.

16. The computer readable medium of claim 15 wherein the tagging template further comprises an implicit-no-default indicator to indicate that a namespace is implicit no default, further comprising determining whether the current namespace is implicit no default based on the implicit-no-default indicator.

17. The computer readable medium of claim 10, said method further comprising: hashing the current prefix to an index of a hash anchor array, wherein said searching accesses the hash anchor array for the ancestor namespace.

18. The computer readable medium of claim 10, said method further comprising: passing a current template-chaining data structure comprising a pointer to a previous template-chaining data structure and also comprising a pointer to the namespace declaration of a template, wherein said searching uses said current template-chaining data structure to find the ancestor namespace declaration.

19. An apparatus for performing serialization of at least a portion of an object model comprising at least one namespace, comprising: a processor; and a memory storing one or more instructions that cause the processor to: preprocess a query to identify any implicit no default namespaces, wherein the object model is associated with the query; search for an ancestor namespace based on a current namespace, the ancestor namespace being associated with an ancestor prefix and an ancestor uniform resource identifier (URI), the current namespace declaration being associated with a current prefix and current URI, such that the ancestor prefix matches the current prefix; and when the current namespace is an implicit no default namespace and the ancestor namespace is an explicit default namespace based on, at least in part, the ancestor prefix, generate a serialized namespace declaration for the current namespace.

20. The apparatus of claim 19 wherein the serialized namespace declaration is a serialized XML namespace declaration.

21. The apparatus of claim 19 wherein a stack stores the ancestor namespaces, and further comprising one or more instructions that: push the current prefix and URI onto the stack, wherein said one or more instructions that cause the processor to search searches the stack for the ancestor prefix.

22. The apparatus of claim 19 further comprising one or more instructions that: when no ancestor namespace has an ancestor prefix that matches the current prefix, or when an ancestor namespace matches the current prefix and the ancestor URI is different from the current URI, generate the serialized namespace declaration for the current namespace.

23. The apparatus of claim 19: wherein said one or more instructions that cause the processor to generate the serialized namespace declaration are performed when the implicit no default namespace is not a top constructor at a top query block, wherein the serialized namespace declaration is no default namespace.

24. The apparatus of claim 19 wherein the object model comprises at least one element, and a current tagging template represents the element, the tagging template having a pointer to a previous namespace declaration in an ancestor tagging template, wherein said one or more instructions that cause the processor to search searches for the ancestor namespace using the pointer.

25. The apparatus of claim 24 wherein the tagging template further comprises an implicit-no-default indicator to indicate that a namespace is implicit no default, further comprising one or more instructions that: determine whether a namespace is implicit no default based on the implicit-no-default indicator.

26. The apparatus of claim 19 further comprising one or more instructions that: hash the current prefix to an index of a hash anchor array, wherein said one or more instructions that cause the processor to search accesses the hash anchor array for the ancestor namespace.

27. The apparatus of claim 19 further comprising one or more instructions that: pass a template-chaining data structure comprising a pointer to a previous template-chaining data structure and also comprising a pointer to the namespace of a template, wherein said one or more instructions that cause the processor to search searches using said template-chaining data structure to find the ancestor namespace declaration.

* * * * *